United States Patent
Kehrer

(10) Patent No.: US 7,137,897 B2
(45) Date of Patent: Nov. 21, 2006

(54) SHAFT COMPRISING A PART CONNECTED THERETO BY WELDING

(75) Inventor: Oskar Kehrer, Graz (AT)

(73) Assignee: Magna Steyr Powertrain AG & Co KG (AT)

(*) Notice: Subject to any disclaimer, the term of this patent is extended or adjusted under 35 U.S.C. 154(b) by 56 days.

(21) Appl. No.: 10/471,225

(22) PCT Filed: Mar. 7, 2002

(86) PCT No.: PCT/AT02/00073

§ 371 (c)(1),
(2), (4) Date: Feb. 25, 2004

(87) PCT Pub. No.: WO02/070911
PCT Pub. Date: Sep. 12, 2002

(65) Prior Publication Data
US 2004/0136776 A1 Jul. 15, 2004

(30) Foreign Application Priority Data
Mar. 7, 2001 (AT) .............................. GM169/2001

(51) Int. Cl.
*F16C 3/10* (2006.01)
(52) U.S. Cl. ..................... 464/180; 74/603; 403/271
(58) Field of Classification Search ............. 464/127, 464/180, 182; 403/271, 272; 16/400, DIG. 8; 29/888.08; 74/603; 219/122, 127, 125.11, 219/60 R, 61, 637, 639
See application file for complete search history.

(56) References Cited

U.S. PATENT DOCUMENTS

| | | | | |
|---|---|---|---|---|
| 2,157,918 A | * | 5/1939 | Rankin | 403/272 X |
| 4,049,186 A | * | 9/1977 | Hanneman et al. | 219/61 X |
| 4,319,113 A | * | 3/1982 | Glatthorn et al. | 219/60 R X |
| 4,641,546 A | * | 2/1987 | Mettler | 403/271 X |
| 4,899,615 A | * | 2/1990 | Matt | 403/272 X |
| 5,299,881 A | * | 4/1994 | Mettler-Friedli | |
| 5,625,945 A | * | 5/1997 | Paro | 29/888.08 |

FOREIGN PATENT DOCUMENTS

DE 459 147 * 4/1928 ................ 403/272

* cited by examiner

*Primary Examiner*—Greg Binda
(74) *Attorney, Agent, or Firm*—Harness, Dickey & Pierce, P.L.C.

(57) ABSTRACT

A shaft (1) with a co-rotating element (2) which is secured to it and has a surface located perpendicular to the axis (3) of the shaft, the welding taking place in the fillet formed between the seating surface (4) of the shaft (1) and axially normal surface (6, 8) of the element. To achieve a durable join without adversely affecting true running, a welding bead (20) starts at a starting point (21) on the surface (6; 8) located perpendicular to the axis (3) of the shaft (1), leads to the fillet and then leads back to an end point (21') on the surface (6; 8) located transversely with respect to the axis of the shaft.

4 Claims, 4 Drawing Sheets

SHAFT COMPRISING A PART CONNECTED THERETO BY WELDING

BACKGROUND OF THE INVENTION

The invention relates to a shaft with a co-rotating element fitted and secured to it, the shaft being cylindrical at least in the region in which the element is fitted, and the element having a cylindrical seating surface and at least one surface which is located perpendicular to the seating surface, and the welding taking place in the fillet formed between the seating surface of the shaft and that surface of the element which is located perpendicular to the seating surface. The term region is to be understood as meaning the location where the element is secured and the area surrounding it in at least one longitudinal direction.

The shaft may be a drive shaft, transmission shaft, crankshaft, camshaft or balancing shaft of a piston engine, and the co-rotating element may therefore be any desired flange, a wheel or gear, part of a clutch, a cam or a balancing weight. Consideration may be given in particular to shafts which run at high rotational speeds and are therefore subject to high demands in terms of accuracy and true running. Shafts of this type generally consist of a heat-treated steel or a case-hardened steel, while the elements often consist of a carburizing steel or a case-hardened steel and/or are forgings, investment castings or sintered parts.

Materials which are advantageous and preferred for the co-rotating part are steels with a carbon content of less than 0.45% or cast iron or nodular cast iron, with at least 40% of the matrix of the basic microstructure being formed by ferrite, remainder pearlite, martensite or bainite.

With parts of this type it was hitherto held to be an immutable law that a direct welded joint—in particular by arc welding—has to be avoided, apart from special solutions using friction welding or laser welding. There are two reasons for this: firstly, heating of the shaft causes it to be distorted, which has an adverse effect on true running; secondly, cracks are formed at the start and/or end of the welding bead, reducing the long-term strength and/or leading to premature fractures. The formation of the cracks can be explained, inter alia, by the fact that the establishing and collapsing of the arc cannot be synchronized with the melting of the welds.

It is an object of the invention to make parts of this type accessible to direct welding, in particular arc welding. The shaft and element are to be welded in such a way that a long-term joint is formed without the accuracy, true running or long-term strength being impaired.

SUMMARY OF THE INVENTION

According to the invention, the foregoing object is achieved wherein a welding bead starts at a starting point on the surface located perpendicular to the seating surface, leads to the fillet and then leads back to an end point on the surface located perpendicular to the seating surface. The starting and end points of the welding bead therefore lie outside the more sensitive part, generally the shaft. The starting crater and/or end crater of the welding bead does not cause any problems on the transversely located surface of the element which is subject to lower loads at least in the zone of this surface. The connecting part of these craters then lies in the fillet. The welding bead can but does not have to follow the entire circumference of the shaft; it may remain restricted to one part or a number of parts of the circumference. The favorable loading situation of a weld seam which has been disposed in a fillet of this nature allows the use of a very slender and short welding bead. As a result, and on account of the special shape of the welding bead, the introduction of heat is restricted and the shaft is not distorted.

Various forms of welding bead are advantageous, depending on the position of the surface located perpendicular to the seating surface. If the surface perpendicular to the seating surface of the shaft is substantially axially normal, in a first variant the welding bead leads over a rounded section to the fillet, follows the fillet over an arc section and then leads back, by means of a rounded section, to the end point. This ensures that the welding bead is drawn at a constant rate. Were it to form an angular corner, the dwell time of the arc would be longer at this corner and the local heating of the workpiece would be greater. In a second variant, the welding bead leads in a straight line from the starting point to the end point, and between these points is tangent on the fillet. This is particularly easy to produce, saves feed time and ensures a constant welding speed. On account of the width of the welding bead, despite being guided in a straight line this bead covers an arc of finite length.

If the surface located perpendicular to the seating surface of the shaft is substantially axially parallel, the welding bead leads from the starting point over a rounded section to the fillet and then back to the end point. In a variant, the welding bead leads from the starting point to the end point in an arc which is tangent on the fillet.

In the case of axially parallel surfaces, these surfaces may also be distributed multiply at regular angular intervals over the circumference, each of them, together with the shaft, forming a fillet which receives a welding bead.

The good long-term strength of a joint produced in this way makes it possible, and the desire for the heating to be as low as possible and only local makes it desirable, in a refinement of the invention, for the height of the welding bead to be dimensioned at only one fifteenth ($\frac{1}{15}$) to one twenty-fifth ($\frac{1}{25}$) of the diameter of the shaft. In the case of a fillet seam, the height of the welding bead is defined by the radius of the quarter-circle which delimits the fillet seam.

To improve the thermal and metallurgical properties of the weld seam, provided that no metal electrode inert gas (MIG) welding is carried out, it is advantageous to perform the welding (tungsten electrode inert gas (TIG), plasma or laser welding) under shielding gas and with a cold filler wire being supplied, and in the case of certain base materials it is advantageous for the welding to be carried out with an austenitic filler wire being supplied. The cold filler wire reduces the supply of heat. However, this is only possible if the filler wire does not carry current, as in the case of the MIG process. The austenitic filler wire has the effect of improving the microstructure.

TIG or plasma welding is used if, in the case of an undivided housing, the co-rotating machine element in the housing is to be connected with the shaft which has already been fitted, since in these processes no welding spatter is produced. In this context, a pulsed welding current is particularly advantageous, in order to achieve the minimum possible supply of heat combined, at the same time, with a good penetration.

In a particularly advantageous application of the invention to a balancing shaft of an internal combustion engine, in which case the element is a balancing weight with an eccentric center of gravity, the weld is disposed on that side of the shaft which is remote from the center of gravity. On this side, the mating surface of the element is pressed onto the shaft by the centrifugal force, resulting in a favorable level of stresses.

A design which is particularly favorable in functional and manufacturing technology terms consists in the balancing weight being an eccentric ring with two end faces and a cutout with two inner end faces on that side of the shaft which is remote from the center of gravity, so that it comprises two ring parts with inner surfaces facing one another on either side of the cutout, and a segment part on the side of the eccentric center of gravity. In this form of the balancing weight, a maximum of eccentricity of the center of gravity is achieved with a minimum total mass. This means that even in extreme circumstances there are four planar surfaces located perpendicular to the axis of the shaft and two planar surfaces located parallel to the axis available for the welded joint, two of the transversely located surfaces only over part of the circumference.

One advantageous solution consists in the welding beads being disposed only on the axially normal inner surfaces. They take up scarcely any space there and are located at a position of the shaft at which they are not under stress on account of the supporting action of the balancing weight surrounding them.

A particularly good solution consists in the welding beads being arranged on the axially parallel inner surfaces and two of these surfaces lying diametrically opposite one another. This means that any heat-induced distortions are symmetrical with respect to the center and cancel one another out.

BRIEF DESCRIPTION OF THE DRAWINGS

In the text which follows, the invention is described and explained on the basis of illustrations, in which.

DETAILED DESCRIPTION

Figure 1:
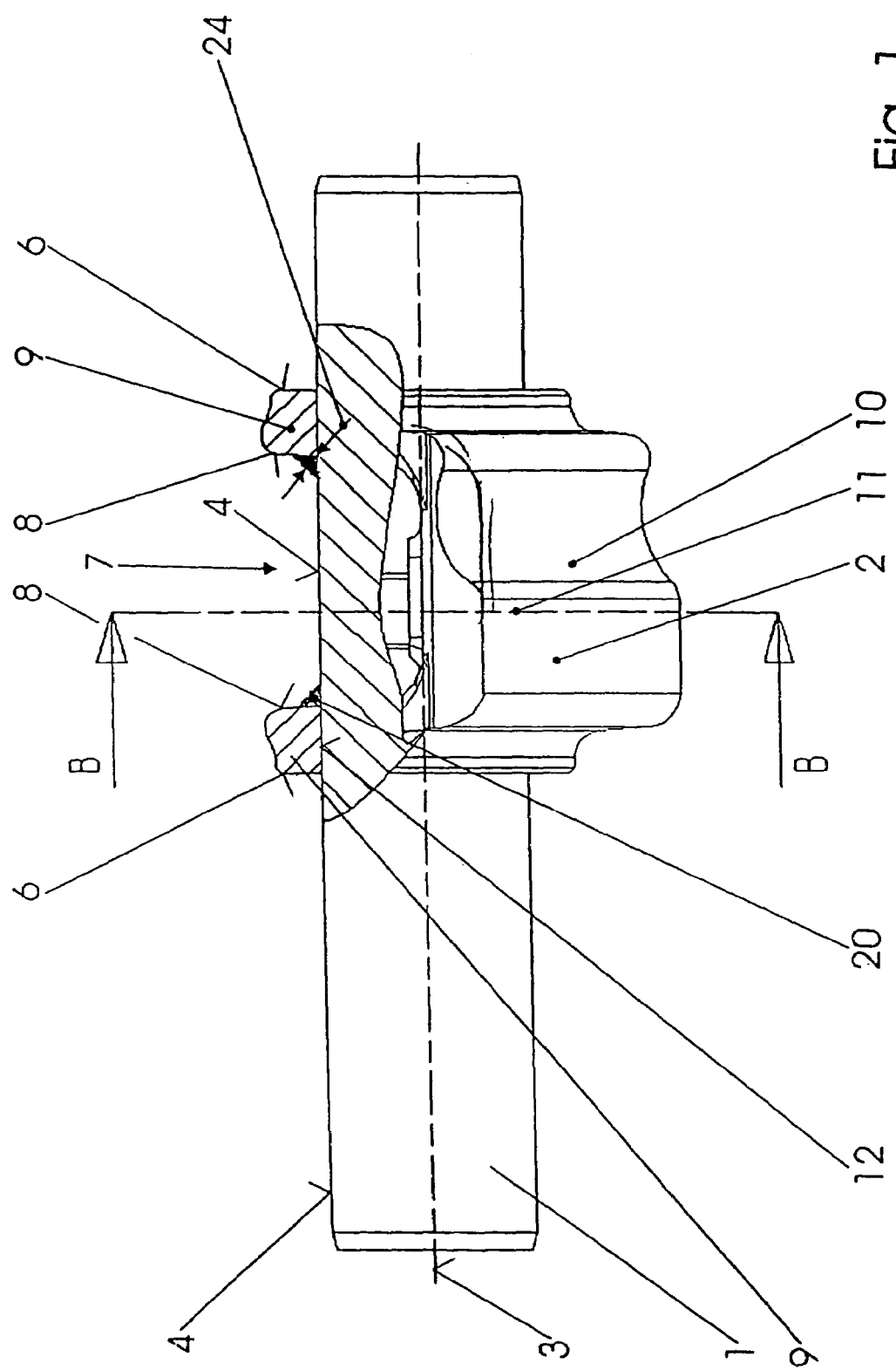
FIG. 1 shows a longitudinal section through the subject matter of the invention.
Figure 2:
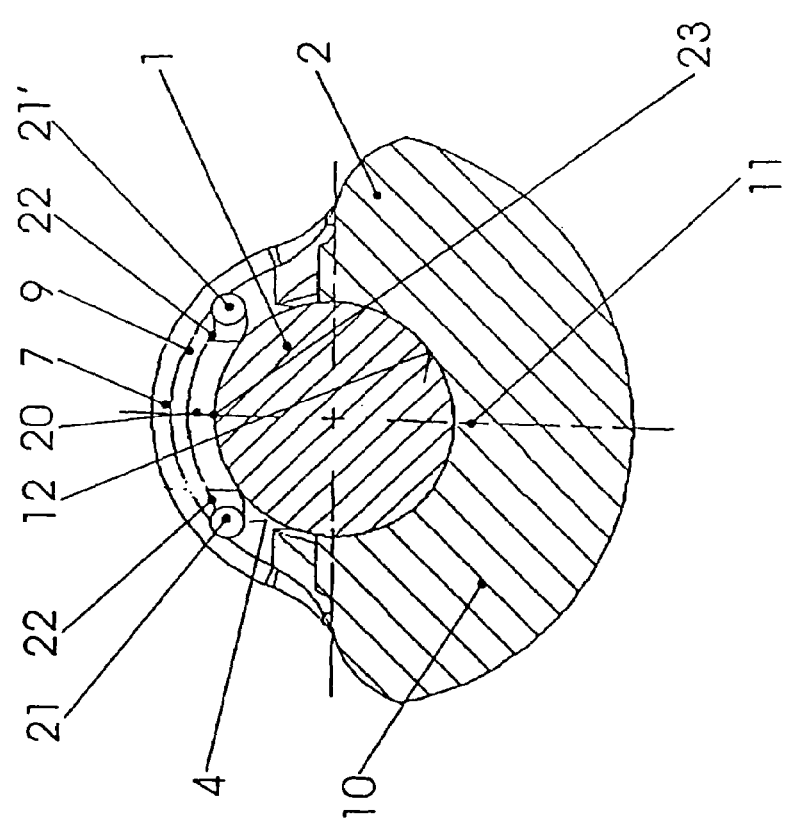
FIG. 2 shows a cross section on B—B in FIG. 1.

In FIG. 1 and FIG. 2, a shaft is denoted by 1, its axis of rotation is denoted by 3 and a co-rotating element secured to the shaft 1 is denoted by 2. The shaft is in this case a balancing shaft, while the co-rotating element is a balancing weight which is located on the cylindrical seating surface 4 of the shaft 1. The shaft 1 is in this case cylindrical over its entire length, but could also be stepped and increased in diameter on one side of the element.

The element 2, in this case a balancing weight, has two outer surfaces 6 and a cutout 7 extending only over part of its circumference, forming two inner end faces 8. These end faces generally lie transversely with respect to the axis 3, in this specific case normally with respect to the axis 3. In this way, a right-angled fillet is formed between the surfaces 6, 8 and the cylindrical seating face 4 of the shaft, and this fillet is a suitable location for the welding. The surfaces 6, 8 do not have to be axially normal; it is sufficient for their generatrix to include an angle with the seating surface 4 of the shaft which is of the order of magnitude of a right angle. In most cases, the surfaces are planar.

The balancing weight 2 comprises two ring parts 9 and a segment part 10 with an eccentric center of gravity 11. The two ring parts with the cutout 7 between them therefore form a "set of braces" which holds the segment part 10 in place counter to the centrifugal force during operation. The balancing weight 2 has a cylindrical seating surface 12 which, by way of example, fits in sliding fashion onto the cylindrical seating surface 4 of the shaft.

The shaft in this case consists of a heat-treated steel, for example of heat-treated 42 CrMo4, hardened or case-hardened, which cannot readily be welded under normal circumstances. The welding of parts with a hardened microstructure generally requires particular measures, for example special welding fillers. The balancing weight 2 in this case consists of forged carburizing steel, for example C15, but could also consist, for example, of cast steel or nodular cast iron (e.g. GGG40).

To fix the balancing weight 2 to the shaft 1, a welding bead 20 is placed onto both of the inner surfaces 8. This bead runs from a starting point 21, the starting crater, via a rounded section 22 into an arc section 23, which forms the actual weld seam, and then back via a rounded section 22 to an end point 21', the end crater. The height 24 of the welding bead 20, in this case measured angle-symmetrically with respect to the welded surfaces, can be small. For example, in the case of a shaft's diameter of 25 millimeters, it is 1.3 millimeter. The fact that this welding bead is only thin means that also only a small amount of heat is fed to the workpiece.

Figure 3:
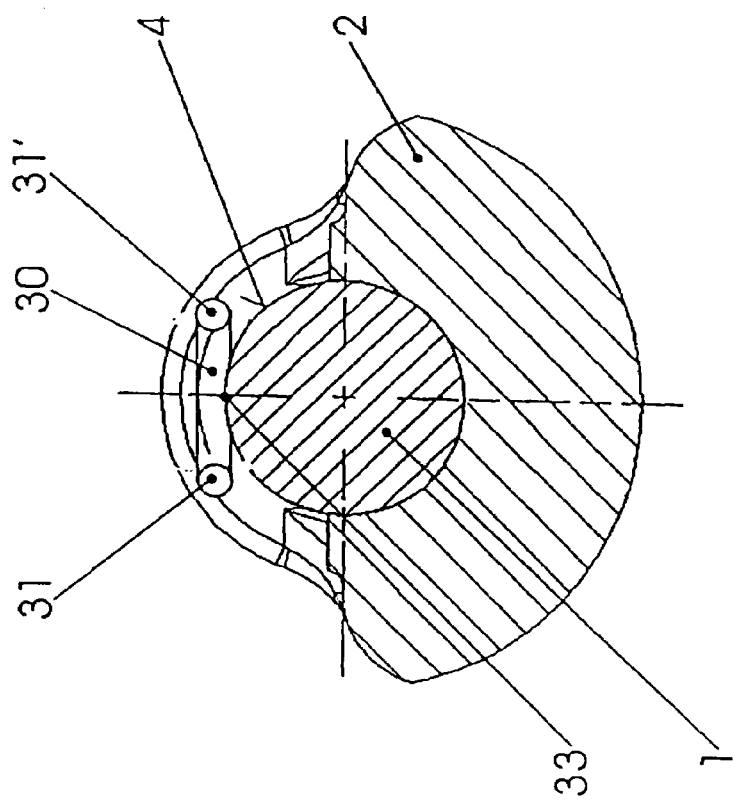
FIG. 3 shows a cross section on B—B in FIG. 1 in a variant.

FIG. 3 shows a variant on FIG. 2, which differs from the latter only in that the welding bead 30 runs in a straight line between starting and end craters 31, 31'. The weld seam itself is in this case only the zone 33 in which the welding bead 30 is tangent on the shaft 1.

Figure 4:
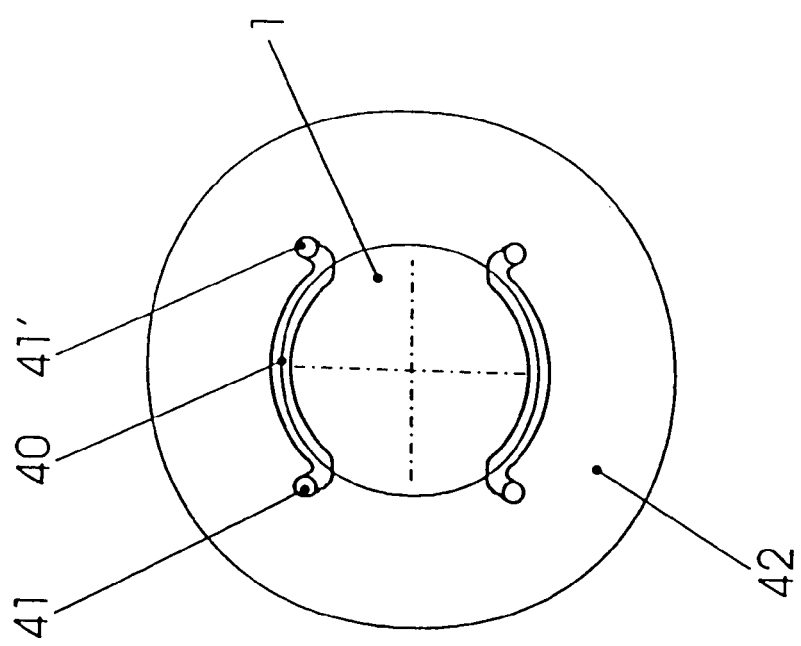
FIG. 4 shows a cross section through a first further embodiment of the invention similar to FIG. 2.

FIG. 4 shows a further exemplary embodiment. A hub 42 is positioned on the shaft 1. To connect it, there are two opposite welding beads 40, the profile of which is the same as that illustrated in FIG. 2. The advantage of the symmetrical arrangement of the welding beads in terms of any thermal distortion will be obvious.

Figure 5:
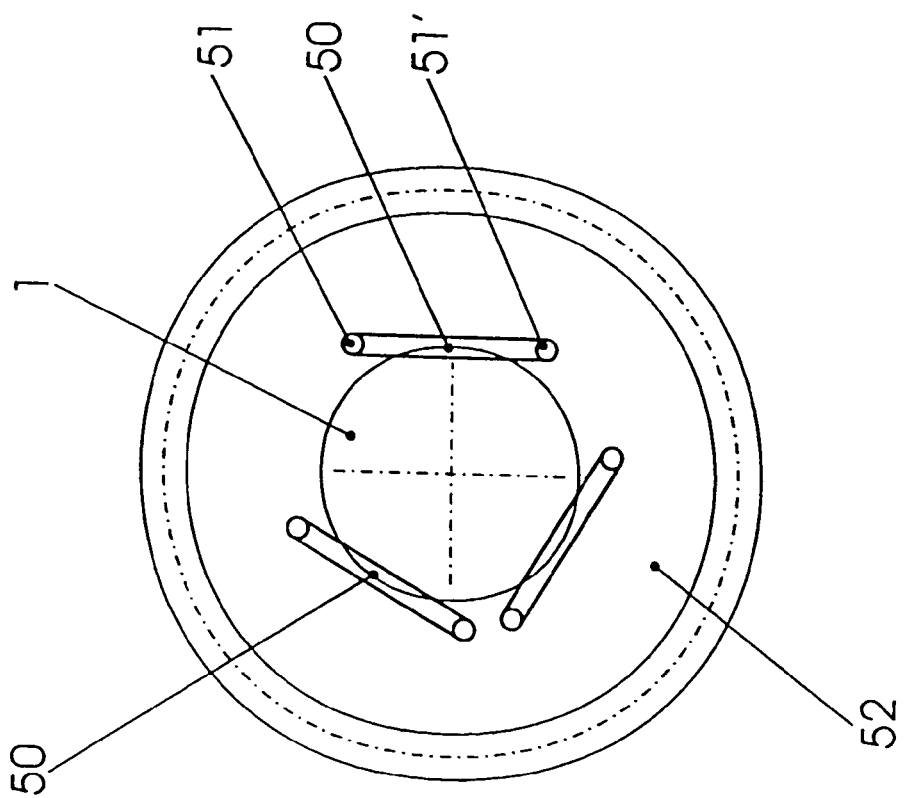
FIG. 5 shows a cross section through a second further embodiment of the invention similar to FIG. 2.

FIG. 5, finally, shows, as one possible application, the securing of a gearwheel 52 on a shaft 1. In this case, there are three rectilinear welding beads 50, the starting crater 51 and end crater 51' of which once again lie only on the gearwheel 52, outside the shaft 1. A welded joint according to the invention can be formed at all the end faces, i.e. in the present case also on that side of the gearwheel 52 which cannot be seen in the figure. If it is case-hardened, it should be free of carburization in the region of the weld seam.

The welding itself is carried out preferably using the TIG or MIG process under shielding gas, in which case, given the pair of materials cited by way of example, an austenitic filler wire is supplied. With a view to minimizing the supply of heat, the filler wire should be supplied cold, i.e. without being preheated.

Figure 6:
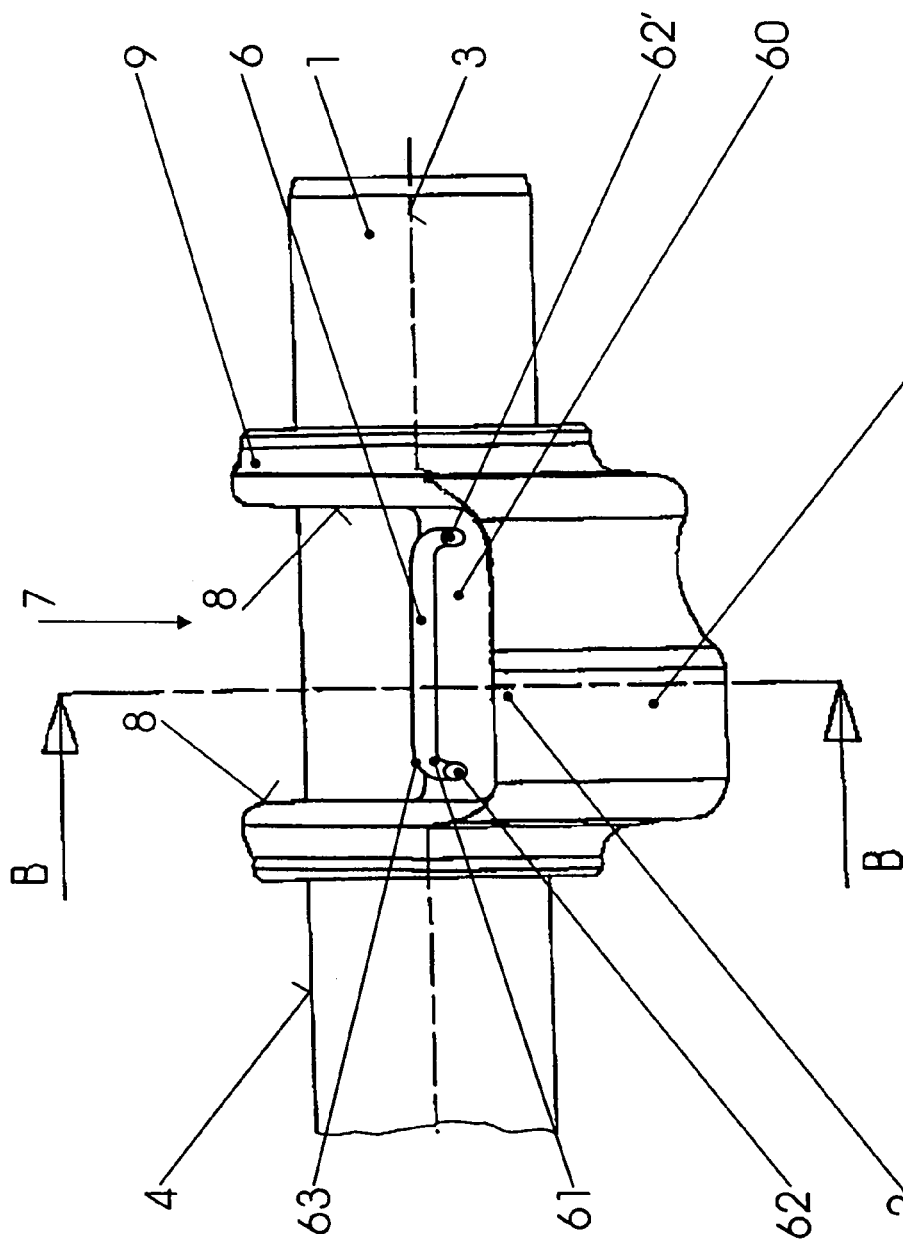
FIG. 6 shows a plan view of the subject matter of FIG. 1 in another embodiment.

FIG. 6 shows another embodiment of the welded joint on the basis of the example of the balancing shaft shown in FIG. 1, which however in this case is shown not in section but rather in full view. This further embodiment can be used as an alternative or in addition to that shown in FIG. 1.

Figure 7:
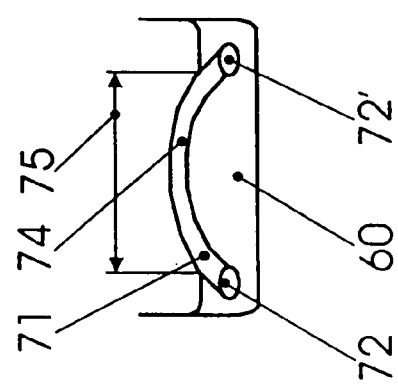
FIG. 7 shows a variant on FIG. 6.

The cutout 7 of rectangular form is delimited by the two inner surfaces 8 in axially normal planes and two further inner surfaces 60 in axially parallel planes. These two surfaces 60 also form fillets, which in this embodiment each receive one welding bead 61, with the seating surface of the shaft. The welding bead 61 runs from a starting crater 62 over a rounded section 63 to the straight part, which produces the welded joint, and then back, over a rounded section, to the end crater 62'. Once again, the two craters 62, 62' are located only on the inner surfaces 60 of the balancing weight 10. In the variant shown in FIG. 7, the welding bead 71 runs in an arc, preferably an arc of a circle, from the starting crater 72 to the end crater 72'. In this case, the arcuate welding bead 71 produces the connection between shaft and balancing weight over a length 74.

In tests, the welded joints described achieved extremely good long-term strength values without reducing the running accuracy of the shafts.

The invention claimed is:

1. A shaft (1) having a co-rotating element (2) fitted and secured thereto, the shaft being cylindrical at least in the region in which the element (2) is fitted, wherein the shaft is a balancing shaft of an internal combustion engine and wherein the element (2) is a balancing weight with an eccentric center of gravity (11), the element includes a cylindrical seating surface (12) and at least one surface which is located perpendicular to the seating surface, and a weld bead located at least in part in a fillet formed between the cylindrical seating surface (4) of the shaft (1) and that surface (6; 8; 60) of the element which is located perpendicular to the seating surface, wherein the welding bead (20; 30; 40; 50; 61; 71) is disposed on that side of the shaft (1) which is remote from the center of gravity (11) and starts at a starting point (21; 31; 41; 51; 62; 72) located perpendicular to the cylindrical seating surface (4) of the shaft (1) and thereafter leads to an end point (21'; 31'; 41'; 51'; 62'; 72') on the surface (6; 8; 60) located perpendicular to the seating surface.

2. The shaft as claimed in claim 1, wherein the surface (6; 8) located perpendicular to the seating surface of the shaft is substantially axially normal, and wherein the welding bead (20; 40) leads from the starting point (21; 41) to the fillet, follows the fillet over an arc section (23) and then leads by means of a rounded section (22), to the end point (21'; 41).

3. The shaft as claimed in claim 1, wherein the balancing weight is an eccentric ring with two axially normal outer surfaces (6) and a cutout (7) on that side of the shaft (1) which is remote from the center of gravity (11), and comprises two ring parts (9) with inner surfaces (8) facing one another on either side of the cutout (7), and a segment part (10) on the side of the eccentric center of gravity.

4. The shaft as claimed in claim 3, wherein the inner surfaces (8) are axially normal, and wherein the welding bead (20; 30) is disposed on the axially normal inner surfaces (8).

* * * * *